Patented Sept. 15, 1942

2,295,643

UNITED STATES PATENT OFFICE 2,295,643

MINERAL FEEDSTUFF

Frederic H. Emery, Bedford, and Irene Levis, Cleveland Heights, Ohio, assignors of one-half to The Harshaw Chemical Company, Cleveland, Ohio, a corporation of Ohio, and one-half to Tennessee Eastman Corporation, Kingsport, Tenn., a corporation of Virginia No Drawing. Application April 23, 1941, Serial No. 389,956

12 Claims. (Cl. 99—2)

This invention relates to feedstuffs for cattle and other domestic animals and has for its principal object to make available to livestock breeders mineral feedstuff compositions containing one or more of the metals manganese, cobalt, iron, copper, calcium, magnesium, and zinc in readily assimilable and palatable form. A further object is to provide a novel and highly effective process for producing such feedstuff compositions.

The present invention is not concerned with the amounts of these metals to be fed to livestock except insofar as the compositions of the invention make possible the feeding of larger amounts than heretofore. Stock breeders will have their own views as to amounts and proportions and will wish to rely upon the recommendations of governmental and private experimenters. We are aware that various inorganic metal compounds have been tried but that difficulty has been experienced in that only small quantities can be included in feedstuffs without rendering the same unpalatable. Irrespective of the amounts of these metals to be fed, a need exists for cheap compositions containing one or a plurality of them which will be palatable to livestock in concentrations high enough to supply the animal with as much of the metals as considered desirable.

We have now discovered that we are able to attain the foregoing and other objects and to meet the above indicated need by reacting one or more of the indicated metals and/or derivatives thereof, e. g., metal salts, oxides and hydroxides, with a suitable edible protein material such as soya bean meal, dried skim milk, casein, fish meal, or the like, and an edible protein splitting acid such as phosphoric acid, hydrochloric acid, sulfuric acid or acetic acid.

Optionally, the protein material may be partially cracked or hydrolyzed with caustic alkali (e. g. NaOH) as a preliminary step whereby the quantity of acid required is reduced. The reaction product may be neutralized, if desired, with calcium or magnesium hydrate or a mixture thereof, such as dolomite hydrate.

The materials are intimately admixed, the acid preferably being added after the metal salt or salts and protein material have been admixed, in the presence of water, preferably not more than enough to produce a doughy mass, and the mass is dried at an elevated temperature low enough to avoid scorching the product, preferably 60° C. to 125° C., suitably about 100° C. Preferably air at the desired temperature is forced through the mass while it is being stirred or tumbled.

We believe that complex reactions occur, but whether this is true, and of the nature of such reactions, we are not certain. In any event, the product is palatable to animals such as cattle and swine and the ingredients become closely associated at least physically and probably chemically.

The material may be fed to livestock alone or in admixture with other feedstuffs.

Among the protein materials we prefer to use soya bean meal, an article of commerce of fairly definite composition usually containing from 40% to 46% protein, from 27% to 33% of carbohydrates and from 0.1% to 2% of fatty matter.

The preferred sources of metals are the oxides, hydrates, i. e. hydrated oxides or hydroxides and carbonates of calcium, magnesium, manganese, cobalt, iron, copper and zinc. Other compounds which can be used, although less desirable on account of cost or effect on the palatability of the product, are: manganese acetate, manganese chloride, manganese sulfate, manganese silicate, iron acetates, iron chlorides, iron lactates, iron sulfates, cobalt chlorides, cobalt sulfates, copper acetate and copper chlorides. The selection of suitable metal salts will be dictated mainly by considerations of cost and palatability of the product. It is clear, of course, that highly toxic materials such as the arsenates and cyanides cannot be used.

Optimum proportions of metal compounds and protein material are such that all the metals are reacted and very little excess of protein material remains. An excess of protein material is not especially objectionable in the product except that large excesses represent unnecessary handling and processing. A small excess of unreacted metals can be tolerated but is undesirable. A safe rule is to use just enough protein material so that microscopic examination reveals substantially no unreacted particles of metal compound in the product.

A suitable quantity of acid is from 1 to 1½ times the molecular equivalent of the metal or metals employed. The product may be neutralized before drying, if desired. For this purpose we may employ a suitable non-toxic alkaline material, e. g. calcium or magnesium hydrates or mixtures thereof such as a hydrated dolomite. Tricalcium phosphate is also suitable. We have employed with good results a colloidal hydrated dolomite known under the trade name, Kemidol.

The concentrated materials produced in accordance with the above described process are suitable for admixture with other feedstuffs in such proportions, e. g. 5% to 50%, that the desired quantities of metals may be supplied regularly to livestock thought to require such dietary supplement.

The following specific examples will serve to illustrate the invention.

Example I

To 100 pounds of water containing 0.3 oz. agar-agar were added with stirring, 40 lbs. of manganese hydrate $(Mn(OH)_2)$, 2½ lbs. of copper sulfate $(CuSO_4.5H_2O)$, 6 lbs. of iron hydrate $(Fe(OH)_2)$ and 2 oz. of cobalt hydrate $$(Co(OH)_2)$$

To the resulting suspension was added with stirring 135 lbs. of soya bean meal and finally 80 lbs. of 75% phosphoric acid were added. The resulting mixture was dried by aerating in air heated to approximately 100° C. The resulting product was a brown, dry, granular material of a somewhat acid character. We have found that this composition may be fed at the rate of one pound per cow per day without noticeable laxative effect and that greater amounts are taken with apparent relish. Our experiments are not yet adequate to justify recommendation for feeding in greater quantities, but we have no reason for believing that cattle may not take considerably greater quantities without ill effects.

Example II

The procedure in Example I was followed except that before drying, 25 lbs. of dolomite hydrate (Kemidol) was stirred in. The product was a gray, dry, granular material, which was approximately neutral.

Example III

To 135 lbs. of soya bean meal were added with stirring, in about 10 minutes, 9 lbs. of caustic soda dissolved in 227 lbs. of hot water. 10.5 lbs. of freshly precipitated manganese hydrate (dry basis), 2.1 lbs. of copper sulfate heptahydrate, 11⅓ lbs. of iron chloride hexahydrate, and 1 oz. of cobalt sulfate $(CoSO_4.7H_2O)$ were stirred into the partially cracked soya bean meal. Finally 44 lbs. of 75% phosphoric acid were added with stirring in about 10 minutes. The resulting mixture was aerated in air heated to approximately 100° C. The resulting product was a sensibly dry, granular material of a yellow color and of a slightly acid reaction and having a salty taste.

Example IV

The product of Example I (or of the other examples) may be admixed with five times its weight of crushed corn and fed to cattle in that form. It may, indeed, be admixed with crushed corn, wheat bran and many other feedstuffs in any desired proportions, e. g. from 5% to 50% by weight and will be found palatable, and the products of the other examples likewise.

Having thus described our invention, what we claim is:

1. A mineral feedstuff in sensibly dry, solid state, being the product produced by heating together in the presence of moisture at least one compound of a metal of the class consisting of manganese, cobalt, iron, copper, calcium, magnesium and zinc, an edible protein material and a protein splitting acid.

2. A mineral feedstuff containing the product of heating at from 60° C. to 125° C. until sensibly dry a moist mixture of (1) at least one compound of at least one metal of the class consisting of manganese, cobalt, iron, copper, calcium, magnesium and zinc, (2) an edible protein material, and (3) a protein splitting acid.

3. A mineral feedstuff containing the product of heating at from 60° C. to 125° C. a mixture containing, in addition to water, a manganese compound, soya bean meal and phosphoric acid.

4. A mineral feedstuff containing the product of heating at from 60° C. to 125° C. a mixture containing, in addition to water, a manganese compound, partially cracked soya bean proteins and a protein splitting acid.

5. A process of preparing a mineral feedstuff comprising forming a moist, intimate admixture of at least one heavy metal compound, soya bean meal and phosphoric acid and heating such mixture with agitation until a sensibly dry, granular, solid material is produced.

6. A process of producing a mineral feedstuff comprising partially cracking an edible protein material by alkaline hydrolysis, admixing the resulting product in the presence of water with at least one heavy metal compound and an edible protein splitting acid and drying the product.

7. A process of preparing a mineral feedstuff comprising forming a moist, intimate mixture of at least one edible metal compound, edible protein material and edible protein splitting acid and heating such mixture with agitation until a sensibly dry, granular material is produced.

8. A sensibly dry, granular, solid mineral feedstuff, being the reaction product of at least one compound of at least one heavy metal, an edible protein material and a protein splitting acid, said ingredients having been admixed in the presence of water and dried at temperatures between 60° C. and 125° C., the said material showing on microscopic examination substantially no unreacted metal salts.

9. A process of preparing a mineral feedstuff comprising bringing together in intimate admixture at least one metal compound, protein material and water, then admixing edible protein splitting acid in aqueous solution, the quantity of water added in both steps being such as to produce a doughy mass and then drying the mass by aerating at a temperature of from 60° C. to 125° C.

10. A process of preparing a mineral feedstuff comprising intimately admixing at least one metal compound with edible protein material in quantity in excess of the quantity of metal compounds by weight, intimately admixing with the resulting mixture an edible protein splitting acid, water being employed in at least one of the recited steps in quantity at least sufficient to produce a stiff dough and drying the product at temperatures between 60° C. and 125° C.

11. A mineral feedstuff being the product of heating at from 60° C. to 125° C. a mixture containing, in addition to water, a manganese compound, soya bean meal and phosphoric acid.

12. A mineral feedstuff being the product of heating at from 60° C. to 125° C. a mixture containing, in addition to water, a manganese compound, partially cracked soya bean proteins and a protein splitting acid.

FREDERIC H. EMERY.
IRENE LEVIS.